US009606226B2

(12) United States Patent
Korakin et al.

(10) Patent No.: US 9,606,226 B2
(45) Date of Patent: Mar. 28, 2017

(54) METHOD AND SYSTEM FOR DETECTING RESIDENTIAL PESTS

(71) Applicants: Yosef Korakin, Rockville, MD (US); Nir Geva, Nes Ziona (IL); Oren Shriki, Rehovot (IL)

(72) Inventors: Yosef Korakin, Rockville, MD (US); Nir Geva, Nes Ziona (IL); Oren Shriki, Rehovot (IL)

(73) Assignee: WALL SENSOR Ltd., Ramot Hashavim (IL)

( * ) Notice: Subject to any disclaimer, the term of this patent is extended or adjusted under 35 U.S.C. 154(b) by 0 days.

(21) Appl. No.: 14/739,041

(22) Filed: Jun. 15, 2015

(65) Prior Publication Data
US 2016/0363666 A1 Dec. 15, 2016

(51) Int. Cl.
G01S 15/00 (2006.01)
G01S 15/04 (2006.01)

(52) U.S. Cl.
CPC .................... G01S 15/04 (2013.01)

(58) Field of Classification Search
CPC ....................................................... G01S 15/04
USPC .............................. 367/93; 340/573.1, 573.2
See application file for complete search history.

(56) References Cited

U.S. PATENT DOCUMENTS

| 5,491,467 | A | 2/1996 | Tracy et al. |
| 5,571,967 | A | 11/1996 | Tanaka et al. |
| 6,001,065 | A | 12/1999 | DeVito |
| 6,023,223 | A | 2/2000 | Baxter, Jr. |
| 6,081,481 | A | 6/2000 | Sabatier et al. |
| 6,255,652 | B1 | 7/2001 | Moyer |
| 6,263,311 | B1 | 7/2001 | Dildy |
| 6,525,658 | B2 | 2/2003 | Streetman et al. |
| 6,552,647 | B1 | 4/2003 | Thiessen |
| 6,691,070 | B1 | 2/2004 | Williams et al. |
| 7,057,516 | B2 * | 6/2006 | Donskoy .............. A01M 1/026 324/637 |
| 8,838,260 | B2 | 9/2014 | Pachet et al. |
| 2002/0096638 | A1 | 7/2002 | Toomey |
| 2003/0039612 | A1 | 2/2003 | Ovington |
| 2004/0162710 | A1 | 8/2004 | Schwartz |
| 2006/0028345 | A1 | 2/2006 | Lee |
| 2007/0096928 | A1 | 5/2007 | Lee |
| 2007/0132598 | A1 * | 6/2007 | Wijenberg ............. A01M 1/02 340/573.2 |
| 2007/0192032 | A1 | 8/2007 | David |
| 2008/0069364 | A1 | 3/2008 | Itou et al. |
| 2009/0093917 | A1 | 4/2009 | Smith |
| 2010/0201529 | A1 | 8/2010 | Garrick |
| 2011/0002196 | A1 * | 1/2011 | Weiser .................. A01M 29/16 367/139 |
| 2011/0144829 | A1 * | 6/2011 | Kim ...................... A01M 29/10 701/2 |

(Continued)

FOREIGN PATENT DOCUMENTS

WO  WO 2012136647 A1  11/2012

Primary Examiner — Kerri McNally
(74) Attorney, Agent, or Firm — Reches Patents

(57) ABSTRACT

A detection system for detecting a residential pest, the detection system may include a trigger module that is configured to generate triggering signals for inducing a residential pest to increase an acoustic-detectable activity of the residential pest; and a sensor that is configured sense signals responsive to a generation of the triggering signals.

23 Claims, 7 Drawing Sheets

(56) References Cited

U.S. PATENT DOCUMENTS

2011/0190008 A1    8/2011   Eronen et al.
2013/0041856 A1    2/2013   Benitez et al.
2013/0322215 A1   12/2013   Du et al.

* cited by examiner

METHOD AND SYSTEM FOR DETECTING RESIDENTIAL PESTS

BACKGROUND OF THE INVENTION

Residential pests cause damages to buildings. In many cases the residential pests are hard to detect due to a low acoustic footprint.

There is a growing need to increase the probability of detecting residential pests.

SUMMARY

According to an embodiment of the invention there may be provided a detection system for detecting a residential pest, the detection system may include a transmitter that may be configured to transmit acoustic triggering signals for inducing a residential pest to increase an acoustic-detectable activity of the residential pest; an acoustic sensor that may be configured sense acoustic signals responsive to a transmission of the acoustic triggering signals.

The detection system may include a processor for searching an acoustic signature of the residential pest in the acoustic signals sensed by the acoustic sensor.

The detection system may include a processor for finding suspected acoustic signatures of the residential pest in the acoustic signals sensed by the acoustic sensor; wherein the detection system may be configured to send the sending information about the suspected acoustic signatures to a remote computer for validating the suspected acoustic signatures.

The transmitter may be configured to transmit detection signals generated by the acoustic sensor.

The acoustic triggering signals may represent a sound associated with a threat to the residential pest.

The acoustic triggering signals may represent a sound made by a natural enemy of the residential pest.

The acoustic triggering signals may represent a distress signals sounded by the residential pest.

The detection system may include a controller that may be configured to control a transmission of the acoustic triggering signals.

The detection system may include a controller that may be configured to induce the transmitter to transmit, at a certain point of time, the acoustic triggering signals in response to acoustic signals sensed by the acoustic sensor during a reception period that started before the certain point in time.

The detection system may include a controller that may be configured to induce the transmitter to transmit, at a certain point of time, the acoustic triggering signals in response to a lack of detection of an acoustic signature of the residential pest during a reception period that started before the certain point in time.

The detection system may include a controller that may be configured to induce the transmitter to transmit, at different points of time, different acoustic triggering signals.

The controller may be configured to induce the transmitter to transmit acoustic triggering signals associated with different threat levels during different points in time.

The controller may be configured to induce the transmitter to transmit a sequence of acoustic triggering signals that are associated with an ascending threat levels.

The detection system may include a controller that may be configured to induce the transmitter to transmit, at a certain point of time, first acoustic triggering signals in response to a lack of detection of the acoustic signature during a reception period that started before the certain point in time and to transmit, at the certain point in time, second acoustic triggering signals in response to a detection of the acoustic signature during the reception period that started before the certain point in time.

The detection system may include multiple detection units; wherein each detection unit may include (i) a transmitter that may be configured to transmit acoustic triggering signals for inducing the residential pest to increase an acoustic-detectable activity of the residential pest; and (ii) an acoustic sensor that may be configured sense acoustic signals.

The detection system may include a communication interface that may be configured to receive information about detection signals generated from acoustic sensors of the multiple detection units and to transmit the information about the detection signals over a communication link.

The one or more detection units are configured to relay information from one or more other detection units.

The multiple detection units are configured to communicate with each other using acoustic waves.

The detection system wherein one detection unit may be configured to evaluate a validity of a second detection unit based upon acoustic waves sent from the second detection unit to the first detection unit.

The transmitter and the acoustic sensor are included in a detection unit; wherein the detection unit may include a housing, wherein the housing has an opening that faces an elastic interface that extends from the housing and faces the opening, wherein the elastic interface may be configured to allow a passage of the acoustic triggering signals through the elastic interface.

According to an embodiment of the invention there may be provided a detection unit for detecting a residential pest, the detection unit may include a housing, an acoustic sensor that may be configured to sense acoustic signals generated by a residential pest and is positioned within the housing, wherein the housing has an opening that faces an elastic interface that extends from the housing and faces the opening, wherein the elastic interface may be configured to allow a passage of the acoustic signals acoustic towards the opening.

The detection unit may include a transmitter that may be configured to transmit acoustic triggering signals for inducing a residential pest to increase an acoustic-detectable activity of the residential pest; wherein the elastic interface may be configured to allow a passage of the acoustic triggering signals through the elastic interface.

According to an embodiment of the invention there may be provided a method for detection of a residential pest, the method may include transmitting, by a transmitter, acoustic triggering signals for inducing a residential pest to increase an acoustic-detectable activity of the residential pest; and sensing, by an acoustic sensor, sense acoustic signals that are responsive to the transmission acoustic triggering signals.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
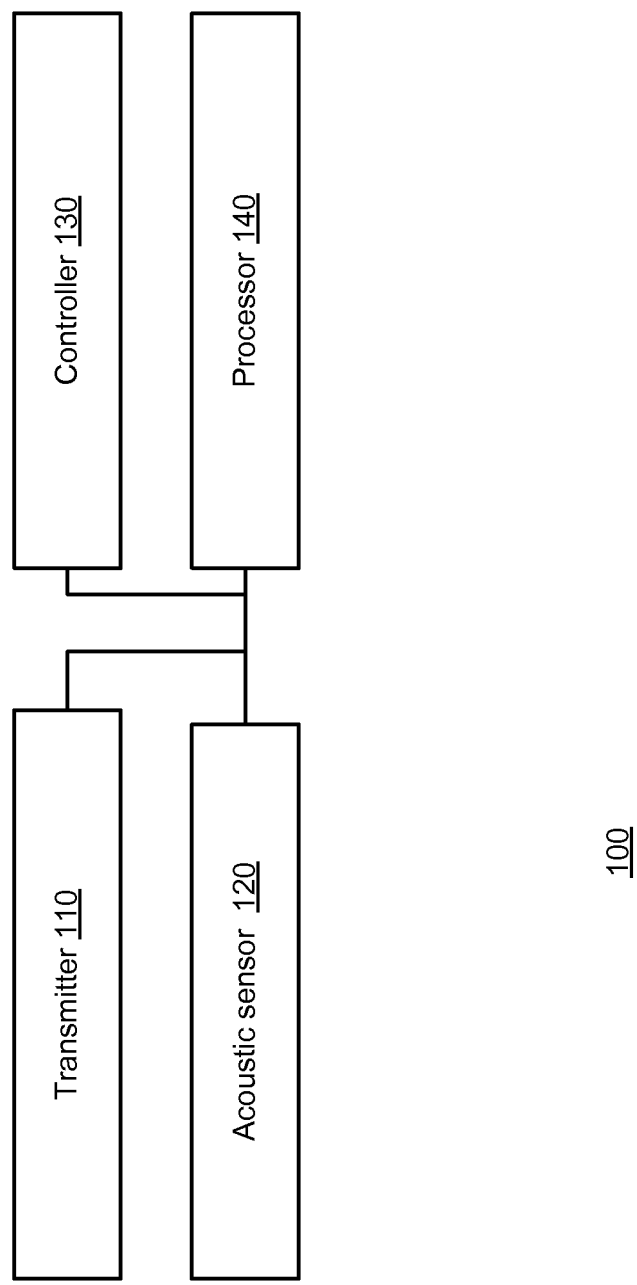
FIG. 1 illustrates a detection unit according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

FIG. 1 illustrates a detection unit 100 according to an embodiment of the invention.

Detection unit 100 may include a transmitter 110 that is configured to transmit acoustic triggering signals for inducing a residential pest to increase an acoustic-detectable activity of the residential pest; and an acoustic sensor 120 that is configured sense acoustic signals responsive to a transmission of the acoustic triggering signals.

FIG. 1 illustrates detection unit 100 as including, in addition, to transmitter 110 and the acoustic sensor 120, (i) a controller 130 for controlling the transmitter 110 and the acoustic sensor 120 and (ii) a processor 140 for processing detection signals generated by the acoustic signals in response to sensed acoustic signals.

The detection signals generated by the acoustic sensor 120 should be processed in order to detect residential pest acoustic signatures. A residential pest acoustic signature identifies the residential pest. The processing can be done solely by processor 140 or only partially by processor 140. The processor may detect the residential pest acoustic signature or may perform only a part of the processing (for example perform a partial processing and/or detect suspected residential pest acoustic signature) and the other part of the processing can be done by another entity such as a computerized device such as a server that may detect the residential pest acoustic signature with a higher certainty.

The residential pest is a pest that resided in a residential building, in proximity to a residential building, beneath a residential building, and the like. Non-limiting examples of residential pests are termites and rodents.

The acoustic triggering signals are aimed to cause the residential pest to increase its acoustic-detectable activity—for example by performing movements that may be detected by the acoustic sensor, by generating acoustic waves that may detected by the acoustic sensor and the like.

The acoustic triggering signals may represent a sound associated with a threat to the residential pest, a sound made by a natural enemy of the residential pest, a distress signals sounded by the residential pest, a sound that represents a man-made hazard.

The detection unit 100 may be perform multiple iterations of (a) transmission of acoustic triggering signals, and (b) sensing of acoustic signals responsive to a transmission of the acoustic triggering signals.

The detection unit may transmit different acoustic triggering signals at different points of time. For example, the detection unit may transmit different acoustic triggering signals during different iterations.

One or more acoustic triggering signals that differ from each other may be aimed to different residential pests or may be aimed to the same residential pest.

The selection of which acoustic triggering signals to transmit may be responsive to at least one of the following parameters: (i) expected residential pets, (ii) detected residential pest, (ii) outcome of one or more sensing periods during which the acoustic sensor sensed acoustic signals.

The selection of which acoustic triggering signals to transmit can be made by controller 130, can be dictated (by a component that may be part of detection unit 100 or may reside outside detection unit 100) to the controller 130, can be made a processor (that may belong to detection unit or may reside outside detection unit 100), and the like.

The detection unit 100 may transmit, during different points of time, acoustic triggering signals associated with different threat levels. For example, the detection unit may start by transmitting acoustic triggering signals of a first threat level and when the transmission of the acoustic triggering signals result in a detection of a residential pest acoustic signature, the detection unit 100 may transmit transmitting acoustic triggering signals of a second threat level that may cause the residential pest to leave the premises. Yet for another example the detection unit 100 may change the acoustic triggering signals thereby changing the threat level associated with the acoustic triggering signals for other reasons. All of the acoustic triggering signals may be aimed for detecting the residential pest and not for cause the residential pest to leave the premises.

Figure 2:
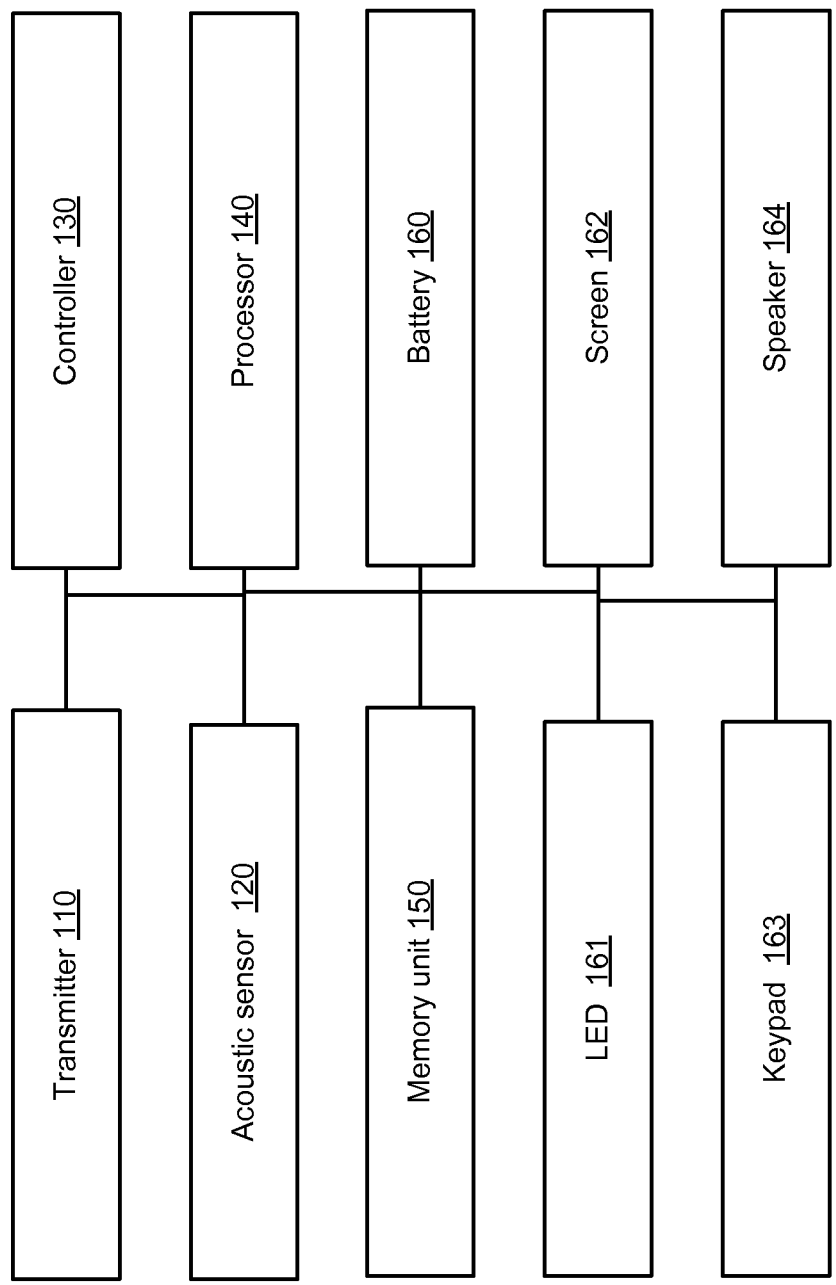
FIG. 2 illustrates a detection unit according to an embodiment of the invention.

FIG. 2 illustrates detection unit 101 according to an embodiment of the invention. Detection unit 101 includes transmitter 110, acoustic sensor 120, controller 130, processor 140, memory unit 150, energy source such as battery 170, and analog to digital interface 180 that may include an analog amplifier that is followed by an analog to digital converter, one or more man machine interface components such as light emitting diode (LED) 161, screen 162, keypad 163 and speaker 164.

The memory unit 150 may include a volatile memory unit, a non-volatile memory unit and the like.

The controller 130 and the processor 140 may be integrated with each other.

The acoustic sensor 120 may be a microphone, a piezoelectric sensor, a vibration sensor, a non-contact radiation based acoustic sensor (such as a laser for illuminating a structural element of the building, a receiver for receiving scattered and/or reflected light) or a combination of one or more of the microphone, the piezoelectric sensor, the vibration sensor, and the non-contact radiation based acoustic sensor.

It is noted that detection unit 101 may be equipped with the one or more man machine interface components when detection unit 101 is intended to directly interface with a human. Alternatively, the detection unit 101 may communicate with another detection unit (not shown) that will be equipped with the one or more man machine interface components.

Figure 3A:
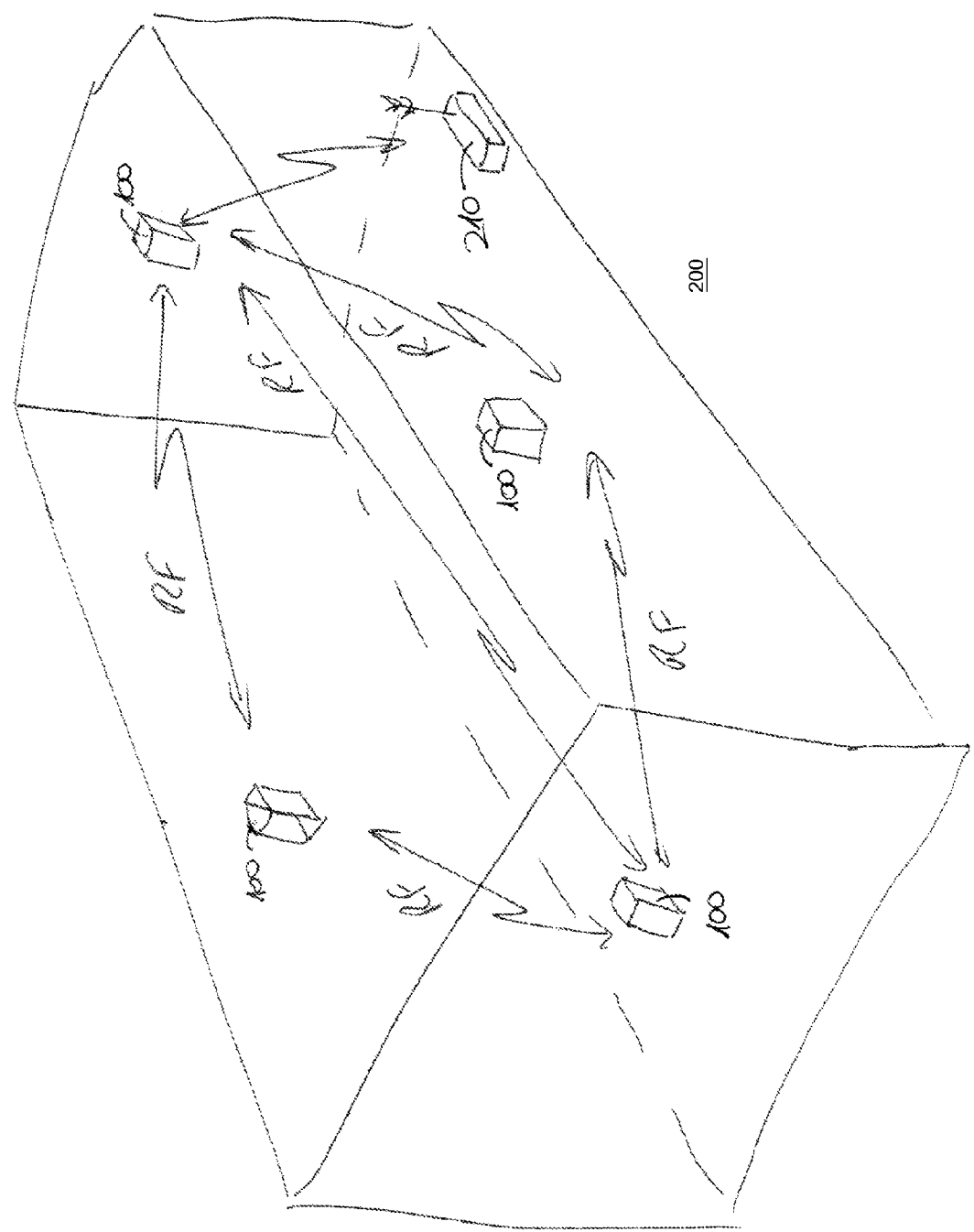
FIG. 3A illustrates a detection system according to an embodiment of the invention.
Figure 3B:
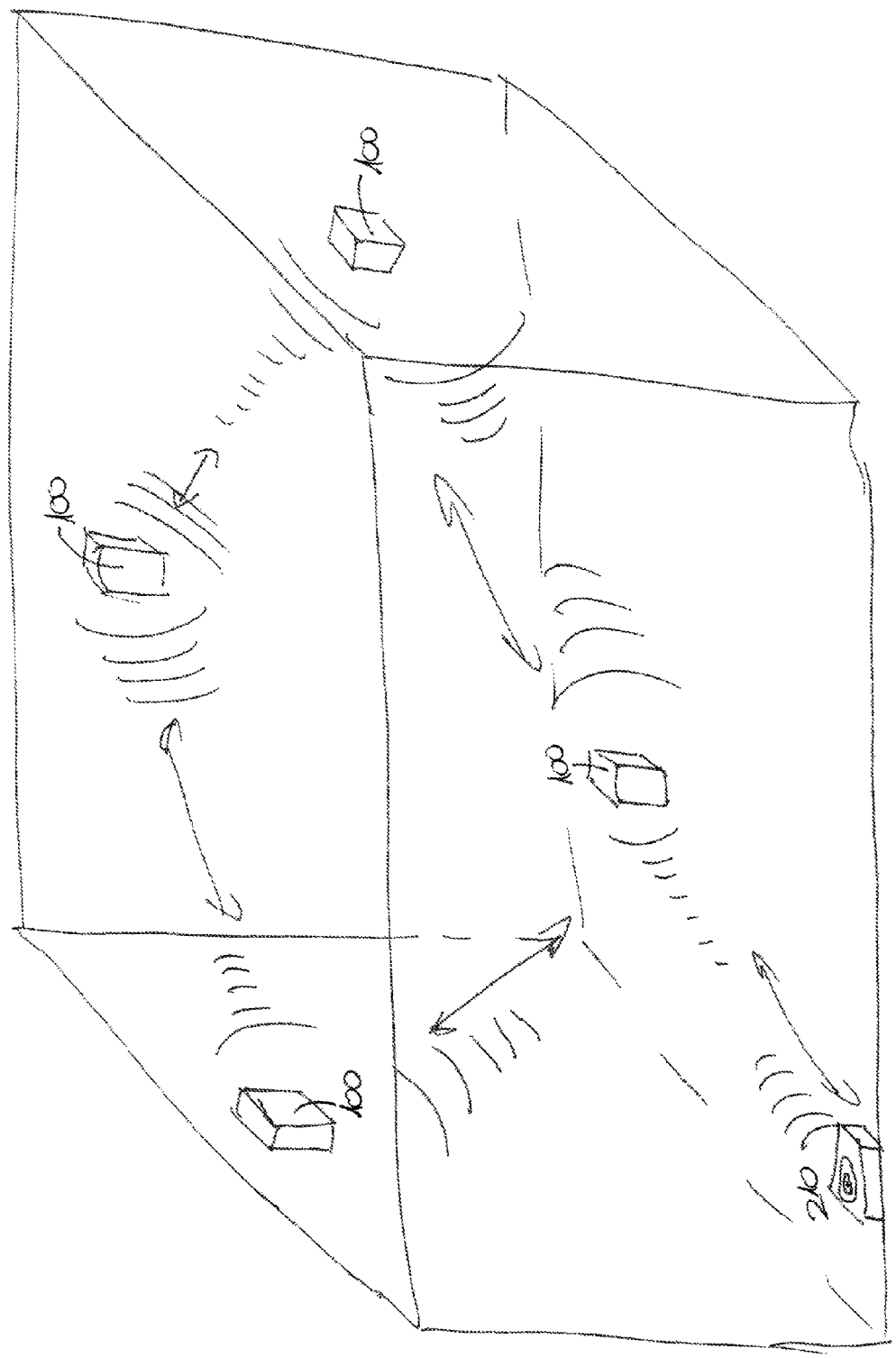
FIG. 3B illustrates a detection system according to an embodiment of the invention.

FIGS. 3A and 3B illustrates detection system 200 according to an embodiment of the invention. Detection system 200 may include one or more detection units 100 (or 101).

Detection system of FIGS. 3A and 3B are illustrated as including four detection units 100 and a communication interface such as hub 210 for exchanging information and/or commands between detection units 100 and a computerized system such as server 220.

The number of detection units 100 may differ from four. There may be more than four detection units or less than four detection units.

Detection units 100 may communicate with each other and/or with hub 210. The detection units 100 may form a mesh, may relay information from unit to the other and/or to or from hub 210.

Detection units 100 may check each other by sending keep alive signals, and the like. One or more detection unit may transmit an acoustic signal, at least one detection unit may sense the transmitted acoustic signal and the detection results may be used to calibrating a detection unit or a plurality of detection units of detection system 200.

Detection units 100 may communicate with each other using acoustic signals (see FIG. 3A) and even use acoustic signals of the same frequencies used for the acoustic triggering signals or using frequencies that differ from the frequency used for acoustic triggering signals.

For example—the detection units may communicate with other using non-acoustic signals such as radio frequency (RF) signals (see FIG. 3B). The detection units may communicate with each other using a proprietary protocol or any other protocol-such as Bluetooth, Zigbee, WiFi and the like.

It is noted that although FIG. 3 illustrates that all the detection units are within a single room that the detection system 200 may include detections units that are positioned within several rooms, outside a residential building, and the like.

Figure 4:
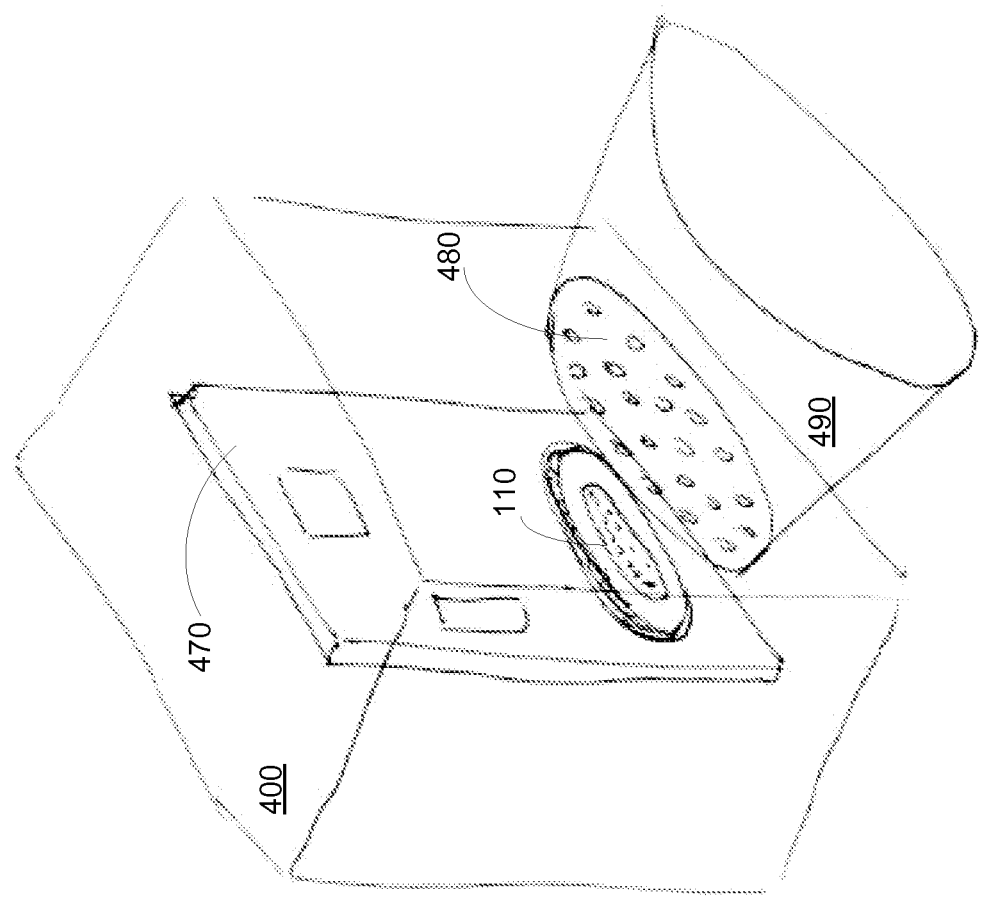
FIG. 4 illustrates a detection unit according to an embodiment of the invention.

FIG. 4 illustrates a mechanical structure of detection unit 100 according to an embodiment of the invention.

Detection unit 100 includes housing 400, electronic components (such as a processor, a controller and an acoustic sensor and a transmitter 110) that are connected to a printed circuit board (PCB) 470. In FIG. 4 the membrane and/or outer interface of the transmitter are shown as facing one or more openings such as openings 480. The acoustic sensor and/or the transmitter may face the one or more openings 480. Except the one or more openings 480 the housing may be hermetically sealed or otherwise configured to acoustically isolate the acoustic sensor from acoustic signals that do not pass through the one or more openings 480.

The one or more openings 480 face an elastic interface 490 that extends from the housing 400 and faces the one or more openings 480. The elastic interface 490 is configured to allow a passage of the acoustic signals acoustic towards the one or more openings 480. The elastic interface 490 may be pressed against a wall of the building or other structural element of a building thereby increasing the transmission and/or reception efficiency of the detection unit 102.

Figure 5:
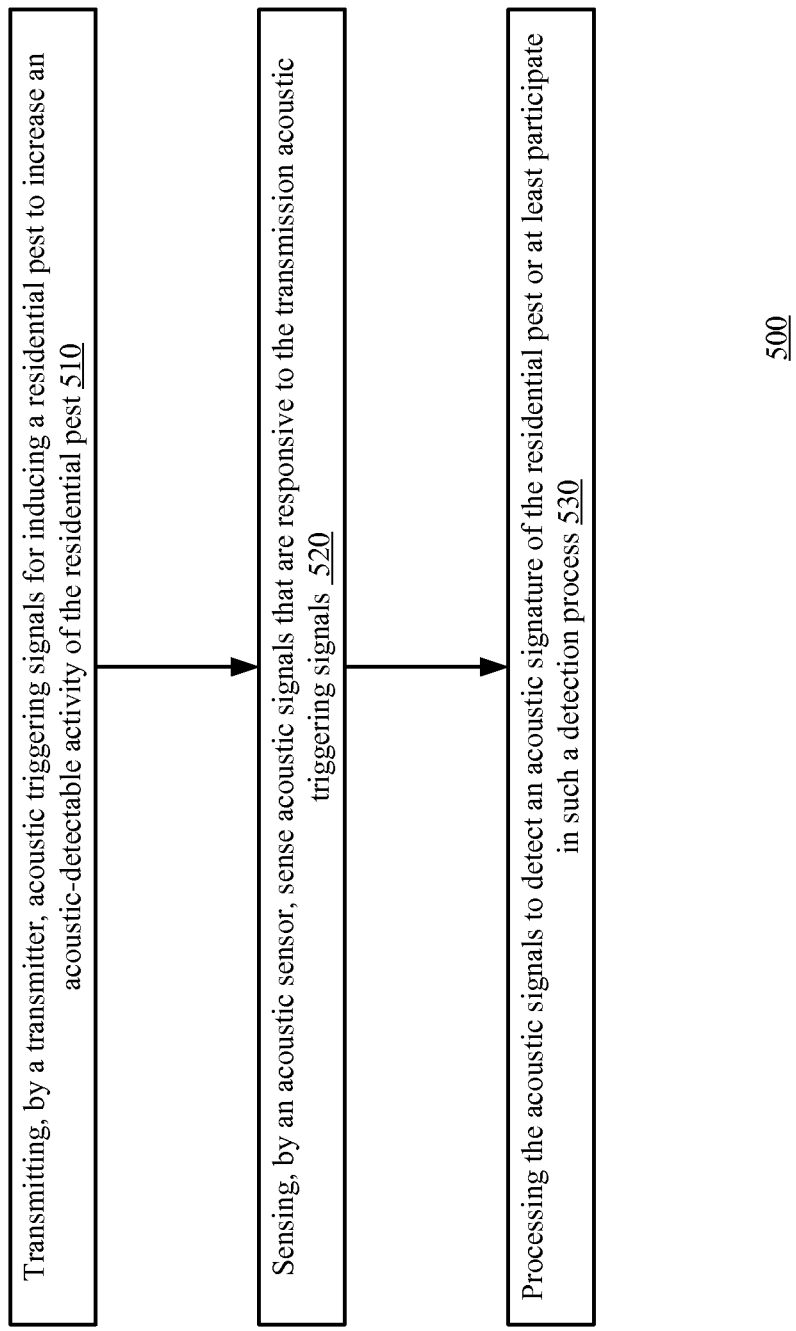
FIG. 5 illustrates a method according to an embodiment of the invention.

FIG. 5 illustrates method 500 according to an embodiment of the invention.

Method 500 may include transmitting (510), by a transmitter, acoustic triggering signals for inducing a residential pest to increase an acoustic-detectable activity of the residential pest; sensing (520), by an acoustic sensor, sense acoustic signals that are responsive to the transmission acoustic triggering signals; and processing (530) the acoustic signals to detect an acoustic signature of the residential pest or at least participate in such a detection process.

While the previous figures referred to a detection system that has a transmitter for transmitting acoustic triggering signals and has a sensor for sensing acoustic signals, the invention is not limited to the acoustic domain. Triggering signals may include at least one out of acoustic triggering signals, mechanical triggering signals chemical triggering signals and visual triggering signals. The sensed signals may include at least one out of acoustic sensed signals, mechanical sensed signals, chemical sensed signals and visual sensed signals.

Figure 6:
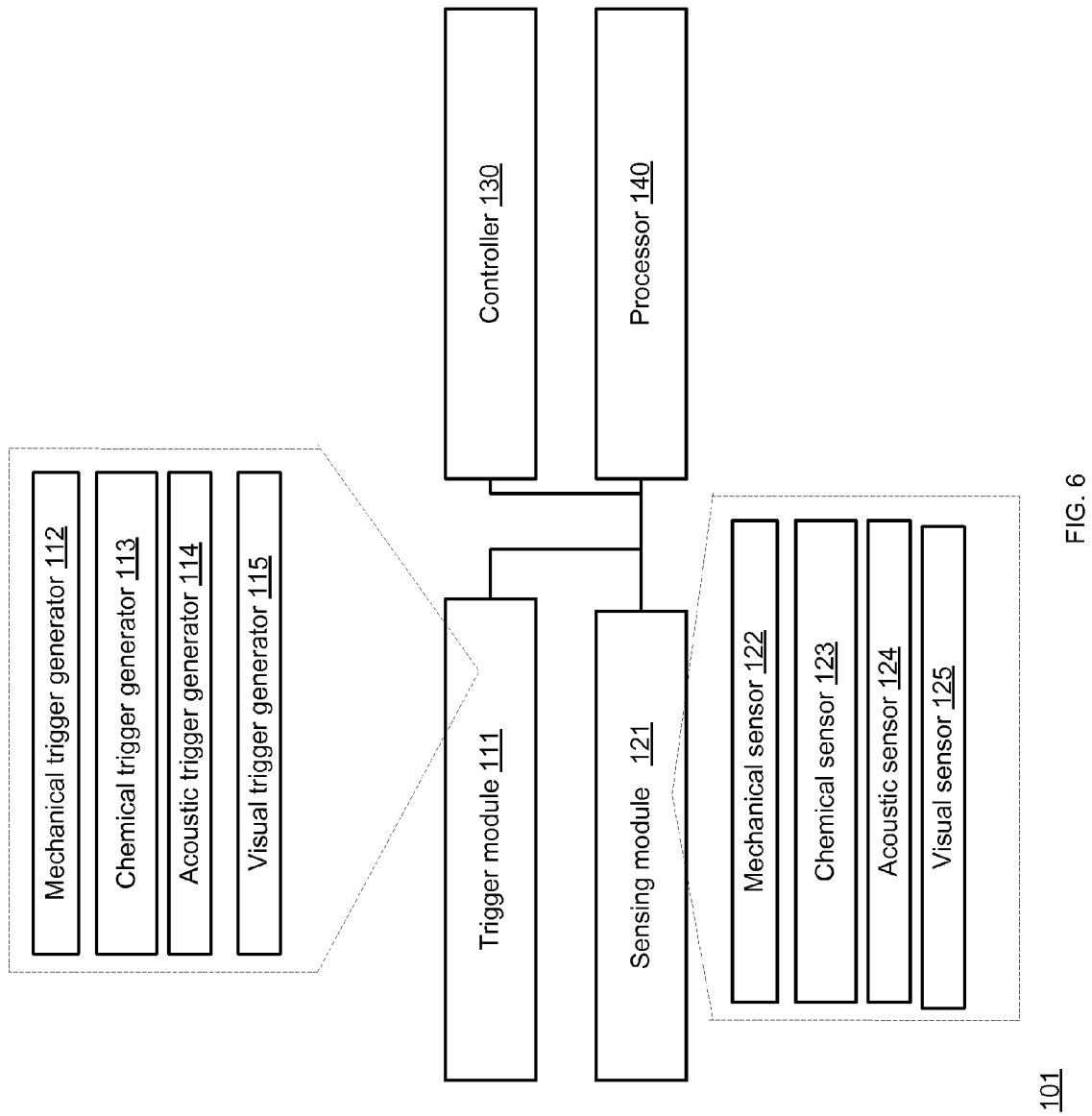
FIG. 6 illustrates a detection unit according to an embodiment of the invention.

FIG. 6 illustrates a detection unit 101 according to an embodiment of the invention.

Detection unit 101 includes trigger module 101, sensing module 120, controller 130 and processor 140.

Detection unit 101 differs from detection unit 100 of FIG. 1 by having a trigger module 111 that may include at least one out of a mechanical trigger module 112, a chemical trigger module 113, an acoustic trigger module 114 (such as transmitter 110 of FIG. 1) for generating triggering module.

The mechanical trigger module 112 may include a vibrator, a hammer or any other mechanical element that is configured to introduce mechanical triggers (such as vibrations).

The mechanical triggers may be provided to a frame of a house or any other structural element that interfaces with the detection unit 101. The chemical trigger module 113 may release gaseous triggering signals.

Detection unit 101 also differs from detection unit 100 of FIG. 1 by having a sensing module 121 that may include at least one out of mechanical sensor 122, chemical sensor 123, acoustic sensor 124 (such as acoustic sensor 120 of FIG. 1) and visual sensor 125. The visual sensor 125 may include a light sensor, an infrared sensor, and the like.

It is noted that the sensor and the triggering module may be of the same type (for example—an acoustic triggering module and an acoustic sensor).

It is noted that the sensor and the triggering modules may differ by type (for example—a chemical triggering module and an acoustic sensor).

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A detection system for detecting a residential pest, the detection system comprises: a trigger module that is configured to generate triggering signals for inducing a residential pest to increase an acoustic-detectable activity of the residential pest; and a sensor that is configured sense signals responsive to a generation of the triggering signals; wherein the trigger module is a transmitter; wherein the sensor is an acoustic sensor; wherein the triggering signals are acoustic triggering signals that are transmitted by the transmitter; wherein the acoustic sensor is configured to sense acoustic signals responsive to the a transmission of the acoustic triggering signals; and wherein the transmitter is further configured to transmit detection signals generated by the acoustic sensor.

2. The detection system according to claim 1, further comprising a processor for searching an acoustic signature of the residential pest in the acoustic signals sensed by the acoustic sensor.

3. The detection system according to claim 1, further comprising a processor for finding suspected acoustic signatures of the residential pest in the acoustic signals sensed by the acoustic sensor; wherein the detection system is configured to send information about the suspected acoustic signatures to a remote computer for validating the suspected acoustic signatures.

4. The detection system according to claim 1, wherein the acoustic triggering signals represent a sound associated with a threat to the residential pest.

5. The detection system according to claim 1, wherein the acoustic triggering signals represent a sound made by a natural enemy of the residential pest.

6. The detection system according to claim 1, wherein the acoustic triggering signals represent a distress signal sounded by the residential pest.

7. The detection system according to claim 1, comprising a controller that is configured to control a transmission of the acoustic triggering signals.

8. A detection system for detecting a residential pest, the detection system comprises:
   a trigger module that is configured to generate triggering signals for inducing a residential pest to increase an acoustic-detectable activity of the residential pest;
   a sensor that is configured sense signals responsive to a generation of the triggering signals; wherein the trigger module is a transmitter; wherein the sensor is an acoustic sensor; wherein the triggering signals are acoustic triggering signals that are transmitted by the transmitter; wherein the acoustic sensor is configured to sense acoustic signals responsive to the a transmission of the acoustic triggering signals; and
   a controller that is configured to induce the transmitter to transmit, at a certain point of time, the acoustic triggering signals in response to acoustic signals sensed by the acoustic sensor during a reception period that started before the certain point in time.

9. A detection system for detecting a residential pest, the detection system comprises:
   a trigger module that is configured to generate triggering signals for inducing a residential pest to increase an acoustic-detectable activity of the residential pest;
   a sensor that is configured sense signals responsive to a generation of the triggering signals; wherein the trigger module is a transmitter; wherein the sensor is an acoustic sensor; wherein the triggering signals are acoustic triggering signals that are transmitted by the transmitter; wherein the acoustic sensor is configured to sense acoustic signals responsive to the a transmission of the acoustic triggering signals; and
   a controller that is configured to induce the transmitter to transmit, at a certain point of time, the acoustic triggering signals in response to a lack of detection of an acoustic signature of the residential pest during a reception period that started before the certain point in time.

10. A detection system for detecting a residential pest, the detection system comprises:
    a trigger module that is configured to generate triggering signals for inducing a residential pest to increase an acoustic-detectable activity of the residential pest;
    a sensor that is configured sense signals responsive to a generation of the triggering signals; wherein the trigger module is a transmitter; wherein the sensor is an acoustic sensor; wherein the triggering signals are acoustic triggering signals that are transmitted by the transmitter; wherein the acoustic sensor is configured to sense acoustic signals responsive to the a transmission of the acoustic triggering signals; and
    a controller that is configured to induce the transmitter to transmit, at different points of time, different acoustic triggering signals.

11. The detection system according to claim 10, wherein the controller is configured to induce the transmitter to transmit acoustic triggering signals associated with different threat levels during different points in time.

12. The detection system according to claim 10, wherein the controller is configured to induce the transmitter to transmit a sequence of acoustic triggering signals that are associated with an ascending threat level.

13. A detection system for detecting a residential pest, the detection system comprises:
    a trigger module that is configured to generate triggering signals for inducing a residential pest to increase an acoustic-detectable activity of the residential pest;
    a sensor that is configured sense signals responsive to a generation of the triggering signals; wherein the trigger module is a transmitter; wherein the sensor is an acoustic sensor; wherein the triggering signals are acoustic triggering signals that are transmitted by the transmitter; wherein the acoustic sensor is configured to sense acoustic signals responsive to the a transmission of the acoustic triggering signals; and
    a controller that is configured to induce the transmitter to transmit, at a certain point of time, first acoustic triggering signals in response to a lack of detection of the acoustic signature during a reception period that started before the certain point in time and to transmit, at the certain point in time, second acoustic triggering signals in response to a detection of the acoustic signature during the reception period that started before the certain point in time.

14. The detection system according to claim 1, comprising multiple detection units; wherein each detection unit comprises (i) a transmitter that is configured to transmit acoustic triggering signals for inducing the residential pest to increase an acoustic-detectable activity of the residential pest; and (ii) an acoustic sensor that is configured sense acoustic signals.

15. The detection system according to claim 14, further comprising a communication interface that is configured to receive information about detection signals generated from acoustic sensors of the multiple detection units and to transmit the information about the detection signals over a communication link.

16. The detection system according to claim 14, wherein the one or more detection units are configured to relay information from one or more other detection units.

17. The detection system according to claim 14, wherein the multiple detection units are configured to communicate with each other using acoustic waves.

18. The detection system according to claim 14, wherein a given detection unit is configured to evaluate a validity of another detection unit based upon acoustic waves sent from the other detection unit to the given detection unit.

19. A detection system for detecting a residential pest, the detection system comprises:
 a trigger module that is configured to generate triggering signals for inducing a residential pest to increase an acoustic-detectable activity of the residential pest;
 a sensor that is configured sense signals responsive to a generation of the triggering signals; wherein the trigger module is a transmitter; wherein the sensor is an acoustic sensor; wherein the triggering signals are acoustic triggering signals that are transmitted by the transmitter; wherein the acoustic sensor is configured to sense acoustic signals responsive to the a transmission of the acoustic triggering signals; and
 wherein the transmitter and the acoustic sensor are included in a detection unit;
 wherein the detection unit comprises a housing, wherein the housing has an opening that faces an elastic interface that extends from the housing and faces the opening, wherein the elastic interface is configured to allow a passage of the acoustic triggering signals through the elastic interface.

20. The detection system according to claim 1, wherein the trigger module comprises a mechanical trigger generator that is configured to generate mechanical triggering signals.

21. The detection system according to claim 1, wherein the trigger module comprises a chemical trigger generator that is configured to release chemical triggering signals.

22. A detection unit for detecting a residential pest, the detection unit comprises a housing, an acoustic sensor that is configured to sense acoustic signals generated by a residential pest and is positioned within the housing, wherein the housing has an opening that faces an elastic interface that extends from the housing and faces the opening, wherein the elastic interface is configured to allow a passage of the acoustic signals towards the opening.

23. The detection unit according to claim 22 further comprising a transmitter that is configured to transmit acoustic triggering signals for inducing a residential pest to increase an acoustic-detectable activity of the residential pest; wherein the elastic interface is configured to allow a passage of the acoustic triggering signals through the elastic interface.

* * * * *